(12) United States Patent
Cai et al.

(10) Patent No.: US 10,354,570 B2
(45) Date of Patent: Jul. 16, 2019

(54) HIGH-POWER POWER SUPPLY FOR USE WITH DISPLAY DEVICES AND ASSOCIATED DISPLAY DEVICE

(71) Applicant: Shenzhen Skyworth-RGB Electronic Co., Ltd., Shenzhen (CN)

(72) Inventors: Shengping Cai, Shenzhen (CN); Qifeng Dai, Shenzhen (CN); Zongwang Wei, Shenzhen (CN)

( * ) Notice: Subject to any disclaimer, the term of this patent is extended or adjusted under 35 U.S.C. 154(b) by 240 days.

(21) Appl. No.: 15/494,941

(22) Filed: Apr. 24, 2017

(65) Prior Publication Data

US 2017/0229051 A1  Aug. 10, 2017

Related U.S. Application Data

(63) Continuation of application No. PCT/CN2016/083709, filed on May 27, 2016.

(30) Foreign Application Priority Data

Nov. 18, 2015 (CN) .......................... 2015 1 0811776

(51) Int. Cl.
G09G 3/00 (2006.01)
G09G 3/20 (2006.01)
(Continued)

(52) U.S. Cl.
CPC ........... *G09G 3/006* (2013.01); *G09G 3/2092* (2013.01); *H02M 1/36* (2013.01); *H02M 1/4241* (2013.01);
(Continued)

(58) Field of Classification Search
CPC .... G09G 3/006; G09G 3/2092; G09G 3/2096; G09G 3/2813; G09G 3/282; G09G 3/288;
(Continued)

(56) References Cited

U.S. PATENT DOCUMENTS

2008/0198638 A1* 8/2008 Reinberger ......... H02M 3/3376
   363/74
2009/0290384 A1* 11/2009 Jungreis .............. H02M 1/4241
   363/17
(Continued)

FOREIGN PATENT DOCUMENTS

CN        2747807 Y    12/2005
CN      200976642 Y    11/2007
(Continued)

OTHER PUBLICATIONS

Fairchild Semiconductor, "FAN9611 Interleaved Dual BCM PFC Controllers", Feb. 2013, all pages. (Year: 2013).*
(Continued)

*Primary Examiner* — Nathan Danielsen
(74) *Attorney, Agent, or Firm* — W&K IP

(57) ABSTRACT

A high-power power supply for use with display devices and an associated display device are provided. The high-power power supply includes an AC conversion module configured to rectify an external AC source into a DC output, a power factor correction circuit configured to perform power factor correction to the DC output and output a correction completion signal when the correction is completed, a power-on control circuit configured to control the power factor correction circuit to be turned on to perform the power factor correction to the DC current when receiving a power-on signal and to control multiple resonance control circuits to be turned on when receiving the correction completion signal, a plurality of resonance control circuits configured to, when turned on, control multiple transformers to operate normally, and multiple transformers configured to supply different operating voltages to the display device. The present disclosure has the advantage of low cost.

16 Claims, 4 Drawing Sheets

(51) Int. Cl.
*H02M 1/36* (2007.01)
*H02M 1/42* (2007.01)
*H04N 5/63* (2006.01)
*H02M 1/44* (2007.01)
*H02M 7/04* (2006.01)
*H02M 1/00* (2006.01)

(52) U.S. Cl.
CPC ............... *H02M 1/44* (2013.01); *H02M 7/04* (2013.01); *H04N 5/63* (2013.01); *G09G 2330/025* (2013.01); *G09G 2330/026* (2013.01); *G09G 2330/06* (2013.01); *H02M 1/4208* (2013.01); *H02M 2001/008* (2013.01); *Y02B 70/126* (2013.01)

(58) Field of Classification Search
CPC ..... G09G 2320/0204; G09G 2330/021; G09G 2330/025–028; G09G 2330/06; G09G 2330/08; H04N 5/63; H02M 1/36; H02M 1/42–4258; H02M 1/44; H02M 2001/0058; H02M 7/04–25; Y02B 70/126
See application file for complete search history.

(56) References Cited

U.S. PATENT DOCUMENTS

2010/0141037 A1  6/2010  Joo et al.
2013/0176296 A1* 7/2013  Cho ........................ G09G 3/32
                                              345/213

FOREIGN PATENT DOCUMENTS

| CN | 203482312 U | 3/2014 |
| CN | 103997237 A | 8/2014 |
| CN | 104935843 A | 9/2015 |
| CN | 105376508 A | 3/2016 |

OTHER PUBLICATIONS

Fairchild Semiconductor, "FSFR-XS Series—Fairchild Power Switch (FPSTM) for Half-Bridge Resonant Converters", Feb. 2013, all pages. (Year: 2013).*

* cited by examiner

HIGH-POWER POWER SUPPLY FOR USE WITH DISPLAY DEVICES AND ASSOCIATED DISPLAY DEVICE

CROSS-REFERENCE TO RELATED APPLICATIONS

This application is a continuation of International Patent Application No. PCT/CN2016/083709 with a filing date of May 27, 2016, designating the United States, now pending, and further claims priority to Chinese Patent Application No. 201510811776.6 with a filing date of Nov. 18, 2015, designating the United States, now pending. The content of the aforementioned applications, including any intervening amendments thereto, are incorporated herein by reference.

TECHNICAL FIELD

The present disclosure relates generally to power supplies, and more particularly to a high-power power supply for use with display devices and an associated display device.

BACKGROUND OF THE PRESENT INVENTION

As the LED display technology continues to develop, while people are pursuing high-definition picture quality and high-accuracy color reproduction, various functions such as gaming, entertainment, network movies and music, or human-computer interaction have been increasingly integrated into the LED display devices, and the LED displays are also having increasingly larger sizes. And in some audio-visual education domains, big LED displays are gradually replacing the traditional blackboard way of teaching.

A typical large-sized display, especially one for use in audio-visual education having prominent human-computer interaction requirement, may usually be equipped with various intelligent multimedia human-machine interaction modules such as a microcomputer module, a backlight drive module, a power amplifier module, and a motherboard module. As the increasingly larger sized LED displays have been posing still higher requirements on their driving capability, to ensure the normal operation of these modules, in the prior art usually several separate power modules may be provided in the same device to convert the input AC power respectively thereby satisfying the power requirements. For example, a separate adapter may be equipped for the microcomputer, a constant-voltage power supply may be provided for the motherboard and the power amplifier module, and a constant-current module may be configured for the backlight module, the constant-current module deriving a voltage from the current-voltage power supply. However, because there are employed multiple power supply modules, and the adapter, the constant-voltage power supply, and the constant-current backlight drive module each uses an independent control circuit and rectifier/filter circuit, the resulting circuitry are complex.

SUMMARY OF PRESENT INVENTION

It is the primary objective of the present disclosure to provide a high-power power supply for use with display devices which is aimed at providing a high-power power supply suitable for use with display devices that has a simple circuit configuration.

To the end mentioned above, there is provided a high-power power supply for use with display devices, the high-power power supply including an AC conversion module, a power factor correction circuit, a power-on control circuit, a plurality of resonance control circuits, and a plurality of transformers configured to supply power to the display device, where a power input terminal of the AC conversion module is configured to input an AC power source, a power output terminal of the AC conversion module is coupled to an input terminal of the power factor correction circuit, an power output terminal of the power factor correction circuit is coupled through each of the plurality of resonance control circuits to the corresponding transformer, an input terminal of the power-on control circuit is coupled to the power output terminal of the AC conversion module, a signal input terminal of the power-on control circuit is coupled to the power factor correction circuit; the power-on control circuit has a plurality of signal output terminals each coupled to the corresponding resonance control circuit. The AC conversion module may be configured to rectify an external AC current into a DC current. The power factor correction circuit may be configured to perform power factor correction to the DC current and output a correction completion signal when the correction is completed, the power-on control circuit may be configured to control the power factor correction circuit to be turned on to perform the power factor correction to the DC current when a power-on signal is received, and to control the resonance control circuits to be turned on when the correction completion signal is received, and the plurality of resonance control circuits may be configured to control, when turned on, the plurality of transformers to operate normally.

The plurality of transformers may comprise a first transformer configured to supply an operating voltage to a microprocessor of the display device, a second transformer configured to provide an operating voltage for a power amplifier of the display device, a third transformer configured to provide an operating voltage for a constant-current backlight source of the display device, and a fourth transformer configured to provide an operating voltage for a motherboard of the display device, the power output terminal of the power factor correction circuit being coupled through each of the plurality of resonance control circuits to the first transformer, the second transformer, the third transformer, and the fourth transformer, respectively.

The second transformer and the fourth transformer may be the same transformer. The second transformer may comprise a primary winding, a first secondary winding, and a second secondary winding. An input terminal of the primary winding of the second transformer may be coupled to a first output terminal of the power factor conversion circuit, and an output terminal of the primary winding of the second transformer may be coupled through a second resonance control circuit to a second output terminal of the power factor conversion circuit.

The power-on control circuit may comprise a signal receiving module, a first power-on module, and a second power-on module, where an input terminal of the signal receiving module is configured to receive an external power-on signal and an output terminal of the signal receiving module is coupled to an input terminal of the first power-on module, an output terminal of the first power-on module is coupled to the power factor correction circuit, an output terminal of the second power-on module is coupled both to the first resonance control circuit and the second resonance control circuit, and an input terminal of the second power-on module is coupled to the power factor correction circuit.

The signal receiving module may comprise a first diode, a first capacitor, a first resistor, a first transistor, a first optical coupler, a first power supply, a second resistor and a third resistor, where an anode of the first diode is coupled to the power-on signal, a cathode of the first diode is coupled through the first resistor to a base of the first transistor, an emitter of the first transistor is grounded, and a collector of the first transistor is coupled to a control output terminal of the first optical coupler; the second resistor is connected between the base of the first transistor and the emitter, and the first capacitor is connected in parallel with the second resistor. The signal receiving module may further comprise a first power supply, and a control input terminal of the first optical coupler may be coupled through the third resistor to the first power supply.

The first power-on module may comprise a second power supply, a fourth resistor, a fifth resistor, a sixth resistor, a seventh resistor, a second transistor, a third transistor, a first voltage regulator, a second diode, a second voltage regulator, a second capacitor, and a third capacitor, where an input terminal of the first optical coupler is coupled to the second power supply, an output terminal of the first optical coupler is coupled through the fourth resistor to a first terminal of the fifth resistor, a second terminal of the fifth resistor is grounded; an anode of the first voltage regulator is grounded, and a cathode of the first voltage regulator is coupled both to the first terminal of the fifth resistor and to a base of the second transistor; an emitter of the second transistor is coupled to a collector of the third transistor, and a collector of the second transistor is coupled to the second power supply; a first terminal of the second capacitor is coupled to the emitter of the second transistor, and a second terminal of the second capacitor is grounded; a first terminal of the sixth resistor is coupled to the collector of the third transistor, and a second terminal of the sixth resistor is grounded via the seventh resistor, where the collector of the third transistor may also be coupled to the second power supply; an anode of the second voltage regulator is grounded, and a cathode of the second voltage regulator is coupled both to the base of the third transistor and a second terminal of the sixth resistor. A cathode of the second diode may output a turned-on signal of the power factor correction circuit, and an anode of the second diode may be grounded via the third capacitor.

The second power-on module may comprise an eighth resistor, a ninth resistor, a tenth resistor, an eleventh resistor, a fourth capacitor, a fourth transistor, a third diode, a fourth diode, a fifth diode, a sixth diode, and a first voltage reference chip, where a first terminal of the eighth resistor is configured to receive a feedback signal in response to the power factor correction circuit being turned on, a second terminal of the eighth resistor is coupled to an anode of the third diode, and a cathode of the third diode is grounded via the fourth capacitor; an anode of the fourth diode is coupled through the ninth resistor to a collector of the fourth transistor, both a cathode of the fourth diode and the cathode of the third diode are to a voltage reference terminal of the first voltage reference chip, a cathode of the first voltage reference chip is coupled via the tenth resistor to a base of the fourth transistor, and an anode of the first voltage reference chip is grounded. The eleventh resistor may be coupled in parallel between the base and the emitter of the fourth transistor. A cathode of the fifth diode may output a turned-on signal of the first resonance control circuit, an anode of the fifth diode may be coupled to the collector of the fourth transistor, while the emitter of the fourth transistor may further be coupled to the second power supply. A cathode of the sixth diode may output a turned-on signal of the second resonance control circuit, and an anode of the sixth diode may be coupled to the collector of the fourth transistor.

The AC conversion module may comprise an EMI filter and a rectifier bridge, an input terminal of the EMI filter being connected to an external AC power source, an output terminal of the EMI being coupled to an input terminal of the rectifier bridge, and an output terminal of the rectifier bridge being coupled to an input terminal of the power factor correction circuit.

There is also provided a display device including the aforementioned high-power power supply for use with display devices, the high-power power supply including an AC conversion module, a power factor correction circuit, a power-on control circuit, a plurality of resonance control circuits, and a plurality of transformers configured to supply power to the display device, where a power input terminal of the AC conversion module is configured to input an AC power source, and a power output terminal of the AC conversion module is coupled to an input terminal of the power factor correction circuit, an power output terminal of the power factor correction circuit is coupled through each of the plurality of resonance control circuits to the corresponding transformer, an input terminal of the power-on control circuit is coupled to the power output terminal of the AC conversion module, a signal input terminal of the power-on control circuit is coupled to the power factor correction circuit; the power-on control circuit has multiple signal output terminals each coupled to the corresponding resonance control circuit. The AC conversion module may be configured to rectify an external AC current into a DC current. The power factor correction circuit may be configured to perform power factor correction to the DC power output and output a correction completion signal when the correction is completed, the power-on control circuit may be configured to control the power factor correction circuit to be turned on to perform the power factor correction to the DC current when a power-on signal is received, and to control the resonance control circuits to be turned on when the correction completion signal is received. The plurality of resonance control circuits may be configured to control, when turned on, the plurality of transformers to operate normally.

The plurality of transformers may comprise a first transformer configured to supply an operating voltage to a microprocessor of the display device, a second transformer configured to provide an operating voltage for a power amplifier of the display device, a third transformer configured to provide an operating voltage for a constant-current backlight source of the display device, and a fourth transformer configured to provide an operating voltage for a motherboard of the display device, the power output terminal of the power factor correction circuit being coupled through each of the plurality of resonance control circuits to the first transformer, the second transformer, the third transformer, and the fourth transformer, respectively.

The second transformer and the fourth transformer may be the same transformer. The second transformer may comprise a primary winding, a first secondary winding, and a second secondary winding. An input terminal of the primary winding of the second transformer may be coupled to a first output terminal of the power factor conversion circuit, and an output terminal of the primary winding of the second transformer may be coupled through a second resonance control circuit to a second output terminal of the power factor conversion circuit.

The power-on control circuit may comprise a signal receiving module, a first power-on module, and a second power-on module, where an input terminal of the signal receiving module may be configured to receive an external power-on signal and an output terminal of the signal receiving module may be coupled to an input terminal of the first power-on module, an output terminal of the first power-on module may be coupled to the power factor correction circuit, an output terminal of the second power-on module may be coupled both to the first resonance control circuit and the second resonance control circuit, and an input terminal of the second power-on module may be coupled to the power factor correction circuit.

The signal receiving module may comprise a first diode, a first capacitor, a first resistor, a first transistor, a first optical coupler, a first power supply, a second resistor and a third resistor, where an anode of the first diode is coupled to the power-on signal, a cathode of the first diode is coupled through the first resistor to a base of the first transistor, an emitter of the first transistor is grounded, and a collector of the first transistor is coupled to a control output terminal of the first optical coupler, the second resistor is connected between the base of the first transistor and the emitter, and the first capacitor is connected in parallel with the second resistor. The signal receiving module may further comprise a first power supply, and a control input terminal of the first optical coupler may be coupled through the third resistor to the first power supply.

The first power-on module may comprise a second power supply, a fourth resistor, a fifth resistor, a sixth resistor, a seventh resistor, a second transistor, a third transistor, a first voltage regulator, a second diode, a second voltage regulator, a second diode, an emitter of the second transistor is coupled to a collector of the third transistor, and a collector of the second transistor is coupled to the second power supply; a first terminal of the second capacitor is coupled to the emitter of the second transistor, and a second terminal of the second capacitor is grounded; a first terminal of the sixth resistor is coupled to the collector of the third transistor, and a second terminal of the sixth resistor is grounded via the seventh resistor, where the collector of the third transistor may also be coupled to the second power supply; an anode of the second voltage regulator is grounded, and a cathode of the second voltage regulator is coupled both to the base of the third transistor and a second terminal of the sixth resistor. A cathode of the second diode may output a turned-on signal of the power factor correction circuit, and an anode of the second diode may be grounded via the third capacitor.

The second power-on module may comprise an eighth resistor, a ninth resistor, a tenth resistor, an eleventh resistor, a fourth capacitor, a fourth transistor, a third diode, a fourth diode, a fifth diode, a sixth diode, and a first voltage reference chip, where a first terminal of the eighth resistor is configured to receive a feedback signal in response to the power factor correction circuit being turned on, a second terminal of the eighth resistor is coupled to an anode of the third diode, a cathode of the third diode is grounded via the fourth capacitor; an anode of the fourth diode is coupled through the ninth resistor to a collector of the fourth transistor, both a cathode of the fourth diode and the cathode of the third diode are coupled to a voltage reference terminal of the first voltage reference chip, a cathode of the first voltage reference chip is coupled via the tenth resistor to a base of the fourth transistor, and an anode of the first voltage reference chip is grounded. The eleventh resistor may be coupled in parallel between the base and the emitter of the fourth transistor. A cathode of the fifth diode may output a turned-on signal of the first resonance control circuit, an anode of the fifth diode may be coupled to the collector of the fourth transistor, while the emitter of the fourth transistor may further be coupled to the second power supply. A cathode of the sixth diode may output a turned-on signal of the second resonance control circuit, and an anode of the sixth diode may be coupled to the collector of the fourth transistor.

The AC conversion module may comprise an EMI filter and a rectifier bridge, an input terminal of the EMI filter being connected to an external AC power source, an output terminal of the EMI being coupled to an input terminal of the rectifier bridge, and an output terminal of the rectifier bridge being coupled to an input terminal of the power factor correction circuit.

Preferably, the power factor correction circuit may be implemented by a Fairchild® semiconductor chip FAN9611.

The plurality of resonance control circuits may be implemented by a Fairchild® semiconductor chip FSFR-XS.

The power-on control circuit may be configured to control the power factor correction circuit to be turned on when the power-on signal is received. After the power factor correction circuit issues a completion signal to the power-on control circuit, the power-on control circuit may be configured to control the plurality of resonance control circuits to be turned on, and each of the plurality of resonance control circuits, after turned on, may be configured to control the corresponding transformer to output a predetermined voltage.

Preferably, the display device may be a television.

The present disclosure proposes a technical solution employing a plurality of transformers for powering the display device, an AC conversion module configured to rectify an external AC power source into a DC output, a power factor correction circuit for performing power factor correction to the DC output and outputting a correction completion signal upon completion of the correction, and a power-on control circuit for controlling the power factor correction circuit to be turned on to perform the power factor correction to the DC output when the power-on signal is received and for controlling a plurality of resonance control circuits to be turned on when the correction completion signal is received, thereby achieving a high-power power supply for use with display devices that has a simple circuit configuration. Specifically, the power-on control circuit may control the power factor correction circuit to be turned on when the power-on signal is received; after the power factor correction circuit operates properly and issues a completion signal to the power-on control circuit, the power-on control circuit may control the plurality of resonance control circuits to be turned on, and the resonance control circuits may control the plurality of transformers to output a plurality of voltages to supply electric power to the display device. The present disclosure is advantageous with its simplified circuit configuration.

DESCRIPTION OF THE DRAWINGS

In order to more clearly illustrate the embodiments of the present disclosure or the prior art solutions, a brief description of the accompanying drawings for use in the illustration of the embodiments or the prior art is provided below. It is obvious that the drawings described below depict merely some embodiments of the disclosure and those of ordinary skill in the art can obtain other drawings based on the arrangements shown in these drawings without making inventive efforts.

DESCRIPTION OF REFERENCE NUMERALS

Figure 1:
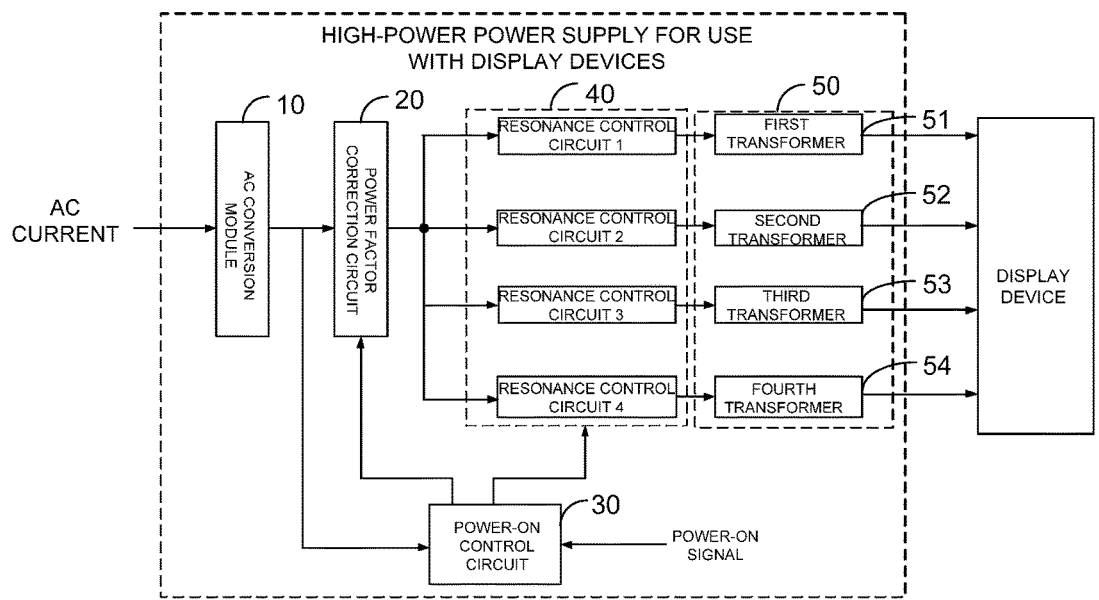
FIG. 1 shows a block diagram illustrating a high-power power supply for use with display devices according to an exemplary embodiment of the disclosure.

| Reference Numeral | Name |
| --- | --- |
| 10 | AC conversion module |
| 11 | EMI filter |
| 12 | Rectifier bridge |
| 20 | Power factor correction circuit |
| 30 | Power-on control circuit |
| 40 | Resonance control circuit |
| 41 | First resonance control circuit |
| 42 | Second resonance control circuit |
| 50 | Transformer |
| 51 | First transformer |
| 52 | Second transformer |
| 53 | Third transformer |
| 54 | Fourth transformer |
| 100 | Signal receiving module |
| 200 | First power-on module |
| 300 | Second power-on module |
| R1 | First resistor |
| R2 | Second resistor |
| R3 | Third resistor |
| R4 | Fourth resistor |
| R5 | Fifth resistor |
| R7 | Seventh resistor |
| R8 | Eighth resistor |
| R9 | Ninth resistor |
| R10 | Tenth resistor |
| R11 | Eleventh resistor |
| D1 | First diode |
| D2 | Second diode |
| D3 | Third diode |
| D4 | Fourth diode |
| D5 | Fifth diode |
| D6 | Sixth diode |
| U1 | First optical coupler |
| U2 | First voltage reference chip |
| Z1 | First voltage regulator |
| Z2 | Second voltage regulator |
| Q1 | First transistor |
| Q2 | Second transistor |
| Q3 | Third transistor |
| Q4 | Fourth transistor |
| R6 | Sixth resistor |

The foregoing objects, features and advantages of the present disclosure will be described in further detail with reference to the accompanying drawings.

DETAILED DESCRIPTION OF PREFERRED EMBODIMENTS

Embodiments of the present disclosure will now be described in such definite and comprehensive details with reference to the accompanying drawings of the disclosure. It is obvious that the embodiments described herein constitute merely part but not all of the embodiments of the disclosure. Therefore all other embodiments obtained by those of ordinary skill in the art based on the embodiments of the present disclosure without making inventive efforts shall all fall in the scope of the disclosure.

It should be noted that in the embodiments herein all directional indications (e.g., top, bottom, left, right, front, back, . . . ) are only intended to illustrate the relative positional relationships or motions among various components under a certain posture or arrangement, so that a directional indication would vary accordingly should the particular posture change.

In addition, references to "first," "second," and the like herein are for illustration purposes only, and are not to be construed as indicating or implying their relative importance or implicitly indicating the number of technical features involved. Thus, a feature that is defined by "first," or "second," and the like may include at least one such feature, either explicitly or implicitly. Furthermore, implementations of various embodiments can be combined with one another. However, such combinations should be predicated on the achievability by those of ordinary skill in the art. Hence, any combinations of different implementations shall be considered to be absent nor within the claimed scope of the disclosure should such combinations result in contradiction or unachievability.

In the present disclosure is proposed a high-power power supply for use with display devices.

FIG. 1 shows a high-power power supply for use with display devices according to an embodiment of the present disclosure. The high-power power supply may include an AC conversion module 10, a power factor correction circuit 20, a power-on control circuit 30, a plurality of resonance control circuits 40, and a plurality of transformers 50 configured to supply power to the display device. A power input terminal of AC conversion module 10 may be configured to input an AC current, while a power output terminal of AC conversion module 10 may be coupled to an input terminal of power factor correction circuit 20. A power output terminal of power factor correction circuit 20 may be coupled through each of the plurality of resonance control circuits 40 to a corresponding transformer 50. An input terminal of power-on control circuit 30 may be coupled to a power output terminal of the AC conversion module 10. The power-on control circuit 30 may include a power-on signal receiving terminal, a feedback signal receiving terminal, and a plurality of signal output terminals, the feedback signal receiving terminal being coupled to the power factor correction circuit 20, each of the plurality of signal output terminals being coupled to a corresponding resonance control circuit 40. The AC conversion module 10 may be configured to rectify an external AC current into a DC current. The power factor correction circuit 20 may be configured to perform power factor correction to the DC current and output a correction completion signal when the correction is completed. The power-on control circuit 30 may be configured to control power factor correction circuit 20 to be turned on to perform the power factor correction to the DC current when a power-on signal is received, and to control the plurality of resonance control circuits 40 to be turned on when the correction completion signal is received. The plurality of resonance control circuits 40, when turned on, may be configured to control the plurality of transformers 50 to operate properly.

The present disclosure can be applied to a large-sized display device, such as an audio-visual equipment including a motherboard, a microprocessor, a power amplifier, and a constant-current backlight, where the power supply can provide power for the audio-visual equipment. In particular, the AC conversion module 10 may be configured to convert the external AC current into DC output. The input terminal of the power-on control circuit 30 may be coupled to the power output terminal of the AC conversion module 10 which thus supplies power to the power-on control circuit 30, and in turn the power-on control circuit 30 may supply power to the CPU (central processing unit) of the audio-visual equipment. After the AC conversion module 10 has been connected to the external power source, the power-on control circuit 30 may be powered on and may then supply power to the CPU, which after booted may issue a power-on signal. When the power-on control circuit 30 receives the power-on signal transmitted by the CPU of the audio-visual equipment, it may control the power factor correction circuit 20 to be turned on, and after the power factor correction circuit 20 has operated properly and produced a completion signal to the power-on control circuit 30, the power-on control circuit 30 can control the plurality of resonance control circuits 40 to be powered up. Consequently, the plurality of resonance control circuits 40, after turned on, may control the respective transformers 50 to output a predetermined voltage, so as to power the microprocessor, the power amplifier, the constant-current backlight source, and the motherboard of the display device, respectively.

Note that in the present embodiment, the power factor correction circuit can be implemented by a Fairchild® semiconductor chip FAN9611. The power factor correction circuit 20 can keep the current of the input voltage at the same phase, thereby improving the working efficiency of the high-power power supply. In addition, power factor correction circuit 20 can also eliminate external electromagnetic interference, which increases the stability of the high-power power supply.

The resonance control circuits 40 can be implemented with a Fairchild Semiconductor FSFR-XS series chip having a MOS transistor, a drive circuit, a control circuit, etc. integrated therein. The resonance control circuits 40 can control the transformers to output a predetermined voltage, which also can enable zero-voltage switching thereby reducing the switching losses.

The present embodiment employs a plurality of transformers 50 for supplying a variety of operating voltages to the display device, an AC conversion module 10 configured to rectify an external AC current into a DC output, a power factor correction circuit 20 for performing power factor correction to the DC output and outputting a correction completion signal when the correction is completed, and a power-on control circuit 30 for controlling the power factor correction circuit 20 to be turned on to perform the power factor correction to the DC power output when the power-on signal is received and for controlling a plurality of resonance control circuits 40 to be turned on when the correction completion signal is received, thereby achieving a high-power power supply for use with display devices that has a simple circuit configuration. Specifically, the power-on control circuit 30 may control the power factor correction circuit 20 to be turned on when the power-on signal is received; after the power factor correction circuit 20 operates properly and issues a completion signal to the power-on control circuit 30, the power-on control circuit 30 may control the plurality of resonance control circuits 40 to be turned on, and the resonance control circuits 40 in turn may control the plurality of transformers 50 to output a plurality of voltages to supply electric power to the display device. The present disclosure is advantageous with its simple circuit configuration.

In particular, the plurality of transformers may comprise a first transformer 51 configured to supply an operating voltage to a microprocessor of the display device, a second transformer 52 configured to provide an operating voltage for a power amplifier of the display device, a third transformer 53 configured to provide an operating voltage for a constant-current backlight source of the display device, and a fourth transformer 54 configured to provide an operating voltage for a motherboard of the display device. The power output terminal of the power factor correction circuit 20 may be coupled through each of the plurality of resonance control circuits 40 to the first transformer 51, the second transformer 52, the third transformer 53, and the fourth transformer 54, respectively.

For sake of reducing the cost and simplifying the circuit configuration, in the present embodiment the fourth transformer 54 may be integrated into the second transformer 52. That is, the second transformer 52 may include two secondary output windings which may output different voltages to the power amplifier and the motherboard of the display device, respectively. As the microprocessor and the constant-current backlight source may pose relatively high requirements on the power supply stability, separate transformers may be employed to power the microprocessor and the constant-current backlight source, respectively.

Figure 2:
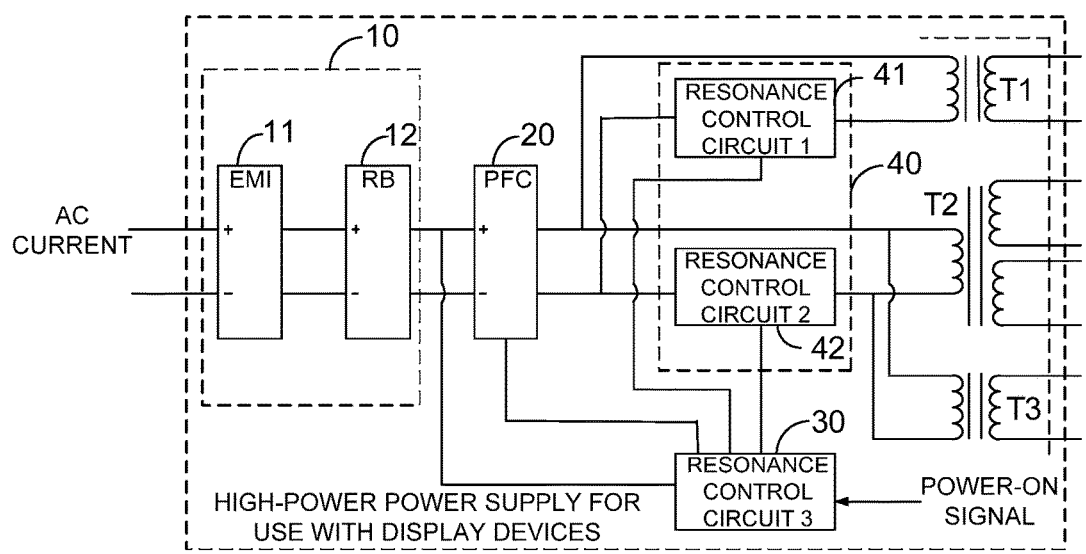
FIG. 2 shows a schematic circuit diagram illustrating a high-power power supply for use with display devices according to an exemplary embodiment of the disclosure.

Referring now to FIG. 2, the first transformer T1 (i.e., the first transformer 51 shown in FIG. 1) may include a primary winding and a secondary winding. The second transformer T2 (i.e., second transformer 52 and fourth transformer 54 shown in FIG. 1) may include a primary winding, a first secondary winding, and a second secondary winding. The third transformer T3 (i.e., third transformer 53 shown in FIG. 1) may include a primary winding and a secondary winding. An input terminal of the primary winding of the first transformer T1 may be coupled to a first output terminal of power factor correction circuit 20, while an output terminal of the primary winding of first transformer T1 may be coupled through first resonance control circuit 40 to a second output terminal of power factor correction circuit 20. An input terminal of the primary winding of second transformer T2 may be coupled to the first output terminal of power factor correction circuit 20, while an output terminal of the primary winding of second transformer T2 may be coupled through second resonance control circuit 40 to the second output terminal of power factor correction circuit 20. Input and output terminals of the primary winding of third transformer T3 may be connected in parallel with the input and output terminals of the primary winding of second transformer T2.

The secondary winding of first transformer T1 may output a voltage of 19v which is configured to power the microprocessor of the audio-visual equipment. The first secondary winding of second transformer T2 may provide a voltage output of 12v which powers the motherboard of the audio-visual equipment, and the second secondary winding of second transformer T2 may output a voltage of 24v which is used to power the power amplifier of the audio-visual equipment. The secondary winding of third transformer T3 may supply a voltage output of 120v which powers the constant-current backlight source.

In the present embodiment either the first resonance control circuit 41 or second resonance control circuit 42 may be implemented with a Fairchild Semiconductor FSFR-XS series chip. The first resonance control circuit 41 may be configured to control the output voltage of first transformer T1, while the second resonance control circuit 42 may be configured to control the output voltages of second transformer T2 and third transformer T3. The resonance control circuit 40 may be provided with a switch tube therein, and thus can enable zero-voltage switching with the switch tube, which reduces the power loss of the switch tube and so improves the efficiency of the high-power power supply.

Figure 3:
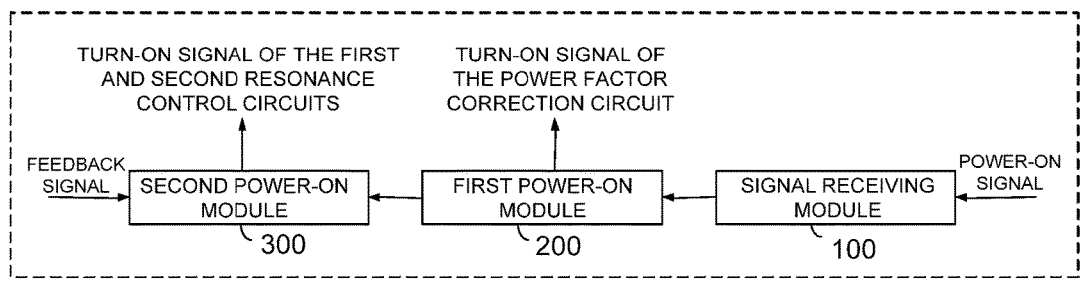
FIG. 3 shows a block diagram illustrating a power-on control circuit according to an exemplary embodiment of the disclosure.
Figure 4:
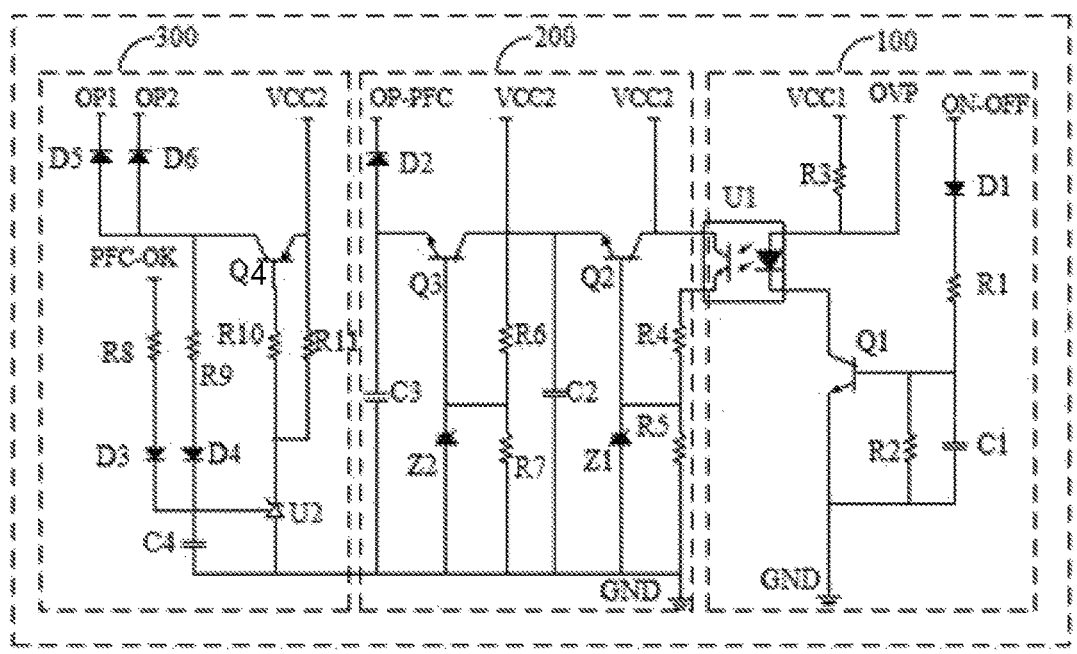
FIG. 4 shows a schematic circuit diagram illustrating a power-on control circuit according to an exemplary embodiment of the disclosure.

Referring now to FIGS. 3 and 4, in the present embodiment the power-on control circuit 30 may comprise a signal receiving module 100, a first power-on module 200, and a second power-on module 300.

Specifically, the signal receiving module 100 may include a first diode D1, a first capacitor C1, a first resistor R1, a first transistor Q1, a first optical coupler U1, a first power supply VCC1, a second resistor R2, and a third resistor R3. An anode of the first diode D1 may be coupled to the power-on signal ON-OFF issued by the CPU of the audio-visual equipment, and a cathode of the first diode D1 may be coupled through the first resistor R1 to a base of the first transistor Q1. A collector of the first transistor Q1 may be coupled to a control output terminal of the first optical coupler U1. The second resistor R2 may be connected between the base and the emitter of the first transistor Q1, while the first capacitor C1 may be connected in parallel with the second resistor R2. The signal receiving circuit may further include a first power supply VCC1. A control input terminal of the first optical coupler U1 may be coupled through the third resistor R3 to the first power supply VCC1, the first power supply VCC1 being configured to supply electric power to the first optical coupler U1. The control input terminal of the first optical coupler U1 may also be configured to receive an overvoltage signal OVP, so that the CPU of the audio-visual equipment may issue an overvoltage signal to cut off the optocoupler output when the external input voltage is too high.

It should be noted that the second resistor R2 and the first capacitor C1 effectively constitute an RC snubber circuit which can speed up the turn-on and turn-off speed of the first transistor Q1 and can also protect the first transistor Q1 from breakdown by the spikes in the circuit.

The first power-on module 200 may comprise a second power supply VCC2, a fourth resistor R4, a fifth resistor R5, a sixth resistor R6, a seventh resistor R7, a second transistor Q2, a third transistor Q3, a first voltage regulator Z1, a second voltage regulator Z2, a second capacitor C2, a second diode D2, and a third capacitor C3. An input terminal of the first optical coupler U1 may be coupled to the second power supply VCC2, and an output terminal of the first optical coupler U1 may be coupled through the fourth resistor R4 to a first terminal of the fifth resistor R5, while a second terminal of the fifth resistor R5 may be grounded. An anode of the first voltage regulator Z1 may be grounded, and a cathode of the first voltage regulator Z1 may be coupled both to the first terminal of the fifth resistor R5 and to a base of the second transistor Q2. An emitter of the second transistor Q2 may be coupled to a collector of the third transistor Q3, while a collector of the second transistor Q2 may be coupled to the second power supply VCC2. A first terminal of the second capacitor C2 may be coupled to the emitter of the second transistor Q2, while a second terminal of the second capacitor C2 may be grounded. A first terminal of the sixth resistor R6 may be coupled to the collector of the third transistor Q3, and a second terminal of the sixth resistor R6 may be connected through the seventh resistor R7 to the ground, where the collector of the third transistor Q3 may also be coupled to the second power supply VCC2. An anode of the second voltage regulator Z2 may be grounded, while a cathode of the second voltage regulator Z2 may be coupled both to the base of the third transistor Q3 and a second terminal of the sixth resistor R6. A cathode of the second diode D2 may output a turned-on signal of the power factor correction circuit 20, and an anode of the second diode may be grounded via the third capacitor C3.

It should be noted that the first power-on module 200 may be configured to control the power factor correction circuit to be turned on. The fourth resistor R4 and the fifth resistor R5 may both be voltage dividing resistors. When the first optical coupler U1 works normally, the voltage across the fifth resistor R5 may rise, while the first voltage regulator Z1 may clamp the voltage across the fifth resistor R5 to a stable level. The voltage across the fifth resistor R5 may be outputted to the base of the second transistor Q2 to drive the second transistor Q2 to conduct. It is also readily appreciated that the sixth resistor R6 and the seventh resistor R7 may also be voltage dividing resistors, and the second voltage regulator Z2 may clamp the voltage across the seventh resistor R7 to a stable level. The voltage across the seventh resistor R7 may be outputted to the base of the third transistor Q3 to drive the third transistor Q3 to conduct.

The second power-on module 300 may include an eighth resistor R8, a ninth resistor R9, a tenth resistor R10, an eleventh resistor R11, a fourth capacitor C4, a fourth transistor Q4, a third diode D3, a fourth diode D4, a fifth diode D5, a sixth diode D6, and a first voltage reference chip U2. A first terminal of the eighth resistor R8 may be used to receive a feedback signal in response to the power factor correction circuit being turned on, while a second terminal of the eighth resistor R8 may be coupled to an anode of the third diode D3, and a cathode of the third diode D3 may be grounded via the fourth capacitor C4. An anode of the fourth diode D4 may be coupled through the ninth resistor R9 to the collector of the fourth transistor Q4, while both the cathode of the fourth diode D4 and the cathode of the third diode D3 may be coupled to a voltage reference terminal of the first voltage reference chip U2. The cathode of the first voltage reference chip U2 may be coupled through the tenth resistor R10 to the base of the fourth transistor Q4, while the anode of the first voltage reference chip U2 may be grounded. The eleventh resistor R11 may be connected in parallel between the base and the emitter of the fourth transistor Q4. The cathode of the fifth diode D5 may output a turned-on signal OP1 of the first resonance control circuit 40 in order to control the first transformer T1T1 to output a voltage of 19v, while the anode of the fifth diode D5 may be coupled to the collector of the fourth transistor Q4, and the emitter of the fourth transistor Q4 may be coupled to the second power supply VCC2. The cathode of the sixth diode D6 may output a turned-on signal OP2 of the second resonance control circuit 40 in order to control the second transformer T2 to output voltages of 12v and 24v and control the third transformer T3 to output a voltage of 120v. The anode of the sixth diode D6 may be coupled to the collector of the fourth transistor Q4.

It should be noted that the second power-on module 300 may be configured to control the first resonance control circuit 41 and the second resonance control circuit 42 to be turned on. The input terminal of the power-on control circuit 30 may draw and convert electric power from the AC conversion module 10 to the first power supply VCC1 and the second power supply VCC2. The first power supply VCC1 may be used to power the signal receiving module 100, while the second power supply VCC2 may be used to supply power to the first power-on module 200 and the transformers. When the CPU of the audio-visual equipment issues a power-on signal ON-OFF, it drives the first transistor Q1 to conduct; the first power supply VCC1 may supply electric power to the first optical coupler U1, which may in turn output a control signal. Hence, the voltage across the two terminals of the fifth resistor R5 may rise, thereby the third transistor Q3 may conduct. The cathode of the second diode D2 may output a high level, i.e., it may output the turned-on signal OP-PFC of the power factor correction circuit. The power factor correction circuit, after working properly, may output a feedback signal PFC-OK, which is a high level, to a terminal of the eighth resistor R8. Thus, a high level would be input to the voltage reference terminal of the first voltage reference chip U2, while the cathode of the first voltage reference chip U2 may output a low level, by which the fourth transistor Q4 may conduct. The collector of the fourth transistor Q4 may output a high level signal. That is, the cathode of the fifth diode D5 may output the turned-on signal OP1 of the first resonance control circuit 41, and the cathode of the sixth diode D6 may output the turned-on signal OP2 of the second resonance control circuit 42. Consequently, the first resonance control circuit 41 may control the first transformer T1 to output a voltage of 19v, while the second resonance control circuit 42 may control the second transformer T2 to output a voltage of 12v and a voltage of 24v and also control the third transformer T3 to output a voltage of 120v. At this point, the boot of the audio-visual equipment is completed.

Furthermore, the AC conversion module 10 may comprise an EMI filter (i.e., EMI) 11 and a rectifier bridge 12 (i.e., RB), an input terminal of the EMI filter 11 being connected to the external AC power source, an output terminal of the EMI filter 11 being coupled to an input terminal of the rectifier bridge 12, and an output terminal of the rectifier bridge 12 being coupled to an input terminal of the power factor correction circuit 20 (PFC). The EMI filter 11 can effectively filter out the external electromagnetic interference into the inside of the audio-visual equipment, thereby improving the stability of audio-visual equipment. The rectifier bridge 12 may be configured to convert the input AC current to DC current that is to be supplied to the power factor correction circuit.

To summarize, according to the present disclosure a plurality of transformers are integrated into a big high-power power supply, and corresponding resonance control circuits 40 are configured to control the transformers to output a voltage respectively. Furthermore, a power-on control circuit 30 is provided to control the timing of the operation of the power factor correction circuit 20, the plurality of resonance control circuits, and the plurality of transformers. The power factor correction circuit 20 is configured to improve the working efficiency of the high-power power supply for use with display devices and to eliminate the external electromagnetic interference, thereby achieving a high-power power supply for use with display devices and having the advantage of simple circuit configuration.

The present disclosure also provides a display device such as a television or audio-visual equipment used for teaching. The display device as provided may include a high-power power supply for use with display devices, the high-power power supply having a particular arrangement as described in the above embodiments. Because the present display device employs all of the implementations of the above embodiments, at least all of the advantages of the implementations of the above embodiments are present here and are not to be repeated.

The foregoing description merely depicts some exemplary embodiments of the present disclosure and therefore is not intended as limiting the scope of the disclosure. Any equivalent structural transformations made to the disclosure, or any direct or indirect applications of the disclosure on any other related fields based on the concepts of the present disclosure, shall all fall in the scope of the disclosure.

We claim:

1. A high-power power supply for use with a display device, comprising an AC conversion module, a power factor correction circuit, a power-on control circuit, a plurality of resonance control circuits, and a plurality of transformers configured to power the display device, wherein a power input terminal of the AC conversion module is configured to input an AC source, a power output terminal of the AC conversion module is coupled to an input terminal of the power factor correction circuit, a power output terminal of the power factor correction circuit is coupled through each of the plurality of resonance control circuits to the corresponding transformer, a power terminal of power-on control circuit is coupled to the power output terminal of the AC conversion module; the power-on control circuit comprises a power-on signal receiving terminal, a feedback signal receiving terminal, and a plurality of signal output terminals, the feedback signal receiving terminal of the power-on control circuit being coupled to the power factor correction circuit, each of the plurality of signal output terminals of the power-on control circuit being coupled to the corresponding resonance control circuit, wherein, the AC conversion module is configured to rectify the external AC source into a DC current;

the power factor correction circuit is configured to perform power factor correction to the DC current and output a correction completion signal after the correction is succeeded;

the power-on control circuit is configured to control the power factor correction circuit to be turned on to perform the power factor correction to the DC source when a power-on signal is received, and to control the plurality of resonance control circuits to be turned on when the correction completion signal is received;

the plurality of resonance control circuits are configured to, when turned on, control the plurality of transformers to operate normally;

the power-on control circuit comprises a signal receiving module, a first power-on module, and a second power-on module, wherein an input terminal of the signal receiving module is configured to receive an external power-on signal, an output terminal of the signal receiving module is coupled to an input terminal of the first power-on module, an output terminal of the first power-on module is coupled to the power factor correction circuit, an output terminal of the second power-on module is coupled both to the first resonance control circuit and the second resonance control circuit, and an input terminal of the second power-on module is coupled to the power factor correction circuit; and the signal receiving module comprises a first diode, a first capacitor, a first resistor, a first transistor, a first optical coupler, a first power supply, a second resistor, and a third resistor; an anode of the first diode is coupled to the power-on signal, and a cathode of the first diode is coupled through the first resistor to a base of the first transistor; an emitter of the first transistor is grounded, and a collector of the first transistor is coupled to a control output terminal of the first optical coupler; the second resistor is connected between the base and the emitter of the first transistor, the first capacitor is connected in parallel with the second resistor; the signal receiving module further comprises a first power supply, and a control input terminal of the first optical coupler is coupled through the third resistor to the first power supply.

2. The high-power power supply according to claim 1, wherein the plurality of transformers comprise a first transformer configured to supply an operating voltage to a microprocessor of the display device, a second transformer configured to provide an operating voltage for a power amplifier of the display device, a third transformer configured to provide an operating voltage for a constant-current backlight source of the display device, and a fourth transformer configured to supply an operating voltage to a motherboard of the display device, wherein the power output terminal of the power factor correction circuit is coupled through each of the plurality of resonance control circuits to the first transformer, the second transformer, the third transformer, and the fourth transformer, respectively.

3. The high-power power supply according to claim 2, wherein the second transformer and the fourth transformer are the same transformer; the second transformer comprises a primary winding, a first secondary winding, and a second secondary winding, wherein an input terminal of the primary winding of the second transformer is coupled to a first output terminal of the power factor conversion circuit, and an output terminal of the primary winding of the second transformer is coupled through a second resonance control circuit to a second output terminal of the power factor conversion circuit.

4. The high-power power supply according to claim 1, wherein the first power-on module comprises a second power supply, a fourth resistor, a fifth resistor, a sixth resistor, a seventh resistor, a second transistor, a third transistor, a first voltage regulator, a second voltage regulator, a second diode, a second capacitor, and a third capacitor; an input terminal of the first optical coupler is coupled to the second power supply, an output terminal of the first optical coupler is coupled through the fourth resistor to a first terminal of the fifth resistor, and a second terminal of the fifth resistor is grounded; an anode of the first voltage regulator is grounded, a cathode of the first voltage regulator is coupled both to the first terminal of the fifth resistor and to a base of the second transistor; an emitter of the second transistor is coupled to a collector of the third transistor, a collector of the second transistor is coupled to the second power supply, a first terminal of the second capacitor is coupled to the emitter of the second transistor, and a second terminal of the second capacitor is grounded; a first terminal of the sixth resistor is coupled to the collector of the third transistor, a second terminal of the sixth resistor is connected through the seventh resistor to the ground, and the collector of the third transistor is also coupled to the second power supply; an anode of the second voltage regulator is grounded, a cathode of the second voltage regulator is coupled both to the base of the third transistor and a second terminal of the sixth resistor; the cathode of the second diode is configured to output a turned-on signal of the power factor correction circuit, and an anode of the second diode is grounded via the third capacitor.

5. The high-power power supply according to claim 4, wherein the second power-on module comprises an eighth resistor, a ninth resistor, a tenth resistor, an eleventh resistor, a fourth capacitor, a fourth transistor, a third diode, a fourth diode, a fifth diode, a sixth diode, and a first voltage reference chip; a first terminal of the eighth resistor is configured to receive a feedback signal in response to the power factor correction circuit being turned on, and a second terminal of the eighth resistor is coupled to an anode of the third diode, and a cathode of the third diode is grounded via the fourth capacitor; an anode of the fourth diode is coupled through the ninth resistor to a collector of the fourth transistor, both a cathode of the fourth diode and the cathode of the third diode are coupled to a voltage reference terminal of the first voltage reference chip, a cathode of the first voltage reference chip is coupled via the tenth resistor to a base of the fourth transistor, and an anode of the first voltage reference chip is grounded; the eleventh resistor is coupled in parallel between the base and an emitter of the fourth transistor; a cathode of the fifth diode is configured to output a turned-on signal of the first resonance control circuit, an anode of the fifth diode is coupled to the collector of the fourth transistor, and the emitter of the fourth transistor is coupled also to the second power supply; a cathode of the sixth diode is configured to output a turned-on signal of the second resonance control circuit, and an anode of the sixth diode is coupled to the collector of the fourth transistor.

6. The high-power power supply according to claim 1, wherein the AC conversion module comprises an EMI filter and a rectifier bridge, an input terminal of the EMI filter being connected to the external AC power source, an output terminal of the EMI filter being coupled to an input terminal of the rectifier bridge, and an output terminal of the rectifier bridge being coupled to an input terminal of the power factor correction circuit.

7. A display device comprising a high-power power supply for use with display devices, the high-power power supply comprising an AC conversion module, a power factor correction circuit, a power-on control circuit, a plurality of resonance control circuits, and a plurality of transformers configured to power the display device, wherein a power input terminal of the AC conversion module is configured to input an AC source, a power output terminal of the AC conversion module is coupled to an input terminal of the power factor correction circuit, a power output terminal of the power factor correction circuit is coupled through each of the plurality of resonance control circuits to the corresponding transformer, a power terminal of power-on control circuit is coupled to the power output terminal of the AC conversion module, the power-on control circuit comprises a power-on signal receiving terminal, a feedback signal receiving terminal, and a plurality of signal output terminals, the feedback signal receiving terminal of the power-on control circuit being coupled to the power factor correction circuit, each of the plurality of signal output terminals of the power-on control circuit being coupled to the corresponding resonance control circuit, wherein, the AC conversion module is configured to rectify the external AC source into a DC current;

the power factor correction circuit is configured to perform power factor correction to the DC current and output a correction completion signal after the correction is succeeded;

the power-on control circuit is configured to control the power factor correction circuit to be turned on to perform the power factor correction to the DC source when a power-on signal is received, and to control the plurality of resonance control circuits to be turned on when the correction completion signal is received;

the plurality of resonance control circuits are configured to, when turned on, control the plurality of transformers to operate normally;

the power-on control circuit comprises a signal receiving module, a first power-on module, and a second power-on module, wherein an input terminal of the signal receiving module is configured to receive an external power-on signal, an output terminal of the signal receiving module is coupled to an input terminal of the first power-on module, an output terminal of the first power-on module is coupled to the power factor correction circuit, an output terminal of the second power-on module is coupled both to the first resonance control circuit and the second resonance control circuit, and an input terminal of the second power-on module is coupled to the power factor correction circuit; and the signal receiving module comprises a first diode, a first capacitor, a first resistor, a first transistor, a first optical coupler, a first power supply, a second resistor, and third resistor; an anode of the first diode is coupled to the power-on signal, and a cathode of the first diode is coupled through the first resistor to a base of the first transistor; an emitter of the first transistor is grounded, and a collector of the first transistor is coupled to a control output terminal of the first optical coupler; the second resistor is connected between the base and the emitter of the first transistor, the first capacitor is connected in parallel with the second resistor; the signal receiving module further comprises a first power supply, a control input terminal of the first optical coupler is coupled through the third resistor to the first power supply.

8. The display device according to claim 7, wherein the plurality of transformers comprise a first transformer configured to supply an operating voltage to a microprocessor of the display device, a second transformer configured to provide an operating voltage for a power amplifier of the display device, a third transformer configured to provide an operating voltage for a constant-current backlight source of the display device, and a fourth transformer configured to supply an operating voltage to a motherboard of the display device, wherein the power output terminal of the power factor correction circuit is coupled through each of the plurality of resonance control circuits to the first transformer, the second transformer, the third transformer, and the fourth transformer, respectively.

9. The display device according to claim 8, wherein the second transformer and the fourth transformer are the same transformer; the second transformer comprises a primary winding, a first secondary winding, and a second secondary winding, wherein an input terminal of the primary winding of the second transformer is coupled to a first output terminal of the power factor conversion circuit, an output terminal of the primary winding of the second transformer is coupled through a second resonance control circuit to a second output terminal of the power factor conversion circuit.

10. The display device according to claim 7, wherein the first power-on module comprises a second power supply, a fourth resistor, a fifth resistor, a sixth resistor, a seventh resistor, a second transistor, a third transistor, a first voltage regulator, a second voltage regulator, a second diode, a second capacitor, and a third capacitor; an input terminal of the first optical coupler is coupled to the second power supply, an output terminal of the first optical coupler is coupled through the fourth resistor to a first terminal of the fifth resistor, and a second terminal of the fifth resistor is grounded; an anode of the first voltage regulator is grounded, a cathode of the first voltage regulator is coupled both to the first terminal of the fifth resistor and to a base of the second transistor; an emitter of the second transistor is coupled to a collector of the third transistor, a collector of the second transistor is coupled to the second power supply, a first terminal of the second capacitor is coupled to the emitter of the second transistor, and a second terminal of the second capacitor is grounded; a first terminal of the sixth resistor is coupled to the collector of the third transistor, a second terminal of the sixth resistor is connected through the seventh resistor to the ground, and the collector of the third transistor is also coupled to the second power supply; an anode of the second voltage regulator is grounded, a cathode of the second voltage regulator is coupled both to the base of the third transistor and a second terminal of the sixth resistor; the cathode of the second diode is configured to output a turned-on signal of the power factor correction circuit, and an anode of the second diode is grounded via the third capacitor.

11. The display device according to claim 10, wherein the second power-on module comprises an eighth resistor, a ninth resistor, a tenth resistor, an eleventh resistor, a fourth capacitor, a fourth transistor, a third diode, a fourth diode, a fifth diode, a sixth diode, and a first voltage reference chip; a first terminal of the eighth resistor is configured to receive a feedback signal in response to the power factor correction circuit being turned on, and a second terminal of the eighth resistor is coupled to an anode of the third diode, and a cathode of the third diode is grounded via the fourth capacitor; an anode of the fourth diode is coupled through the ninth resistor to a collector of the fourth transistor, both a cathode of the fourth diode and the cathode of the third diode are coupled to a voltage reference terminal of the first voltage reference chip, a cathode of the first voltage reference chip is coupled via the tenth resistor to a base of the fourth transistor, and an anode of the first voltage reference chip is grounded; the eleventh resistor is coupled in parallel between the base and an emitter of the fourth transistor; a cathode of the fifth diode is configured to output a turned-on signal of the first resonance control circuit, an anode of the fifth diode is coupled to the collector of the fourth transistor, and the emitter of the fourth transistor is coupled also to the second power supply; a cathode of the sixth diode is configured to output a turned-on signal of the second resonance control circuit, and an anode of the sixth diode is coupled to the collector of the fourth transistor.

12. The display device according to claim 7, wherein the AC conversion module comprises an EMI filter and a rectifier bridge, an input terminal of the EMI filter being connected to an external AC power source, an output terminal of the EMI filter being coupled to an input terminal of the rectifier bridge, and an output terminal of the rectifier bridge being coupled to an input terminal of the power factor correction circuit.

13. The display device according to claim 7, wherein the power factor correction circuit is implemented by a Fairchild® semiconductor chip FAN9611.

14. The display device according to claim 7, wherein the plurality of resonance control circuits are implemented by a Fairchild® semiconductor chip FSFR-XS.

15. The display device according to claim 7, wherein the power-on control circuit is configured to control the power factor correction circuit to be turned on when the power-on signal is received, and after the power factor correction circuit issues a completion signal to the power-on control circuit, the power-on control circuit is configured to control the plurality of resonance control circuits to be turned on, and each of the plurality of resonance control circuits, after turned on, is configured to control the corresponding transformer to output a predetermined voltage.

16. The display device according to claim 7, wherein the display device is a television.

* * * * *